US009702732B2

(12) United States Patent
Repyevsky et al.

(10) Patent No.: US 9,702,732 B2
(45) Date of Patent: Jul. 11, 2017

(54) PROCESS VARIABLE TRANSMITTER WITH LOOP-POWERED WIRELESS TRANSCEIVER

(71) Applicants: Vladimir Viktorovich Repyevsky, Chelyabinsk (RU); Dmitry Yuryevich Iosifov, Chelyabinsk (RU); Andrey Yevgenyevich Popov, Chelyabinsk (RU); Eugene Korolev, Maple Grove, MN (US)

(72) Inventors: Vladimir Viktorovich Repyevsky, Chelyabinsk (RU); Dmitry Yuryevich Iosifov, Chelyabinsk (RU); Andrey Yevgenyevich Popov, Chelyabinsk (RU); Eugene Korolev, Maple Grove, MN (US)

(73) Assignee: Rosemount Inc., Chanhassen, MN (US)

( * ) Notice: Subject to any disclaimer, the term of this patent is extended or adjusted under 35 U.S.C. 154(b) by 162 days.

(21) Appl. No.: 14/389,002

(22) PCT Filed: Mar. 28, 2014

(86) PCT No.: PCT/RU2014/000223
§ 371 (c)(1),
(2) Date: Sep. 29, 2014

(87) PCT Pub. No.: WO2015/147688
PCT Pub. Date: Oct. 1, 2015

(65) Prior Publication Data
US 2015/0276432 A1 Oct. 1, 2015

(51) Int. Cl.
G01D 4/00 (2006.01)
G05B 19/048 (2006.01)

(52) U.S. Cl.
CPC ........... G01D 4/006 (2013.01); G05B 19/048 (2013.01)

(58) Field of Classification Search
CPC ...... G01D 4/006; G05B 19/048; G01L 13/02; G01L 19/14; H04B 1/04; H04B 3/54; H01M 2/1022; H01M 10/425
See application file for complete search history.

(56) References Cited

U.S. PATENT DOCUMENTS 7,120,391 B2 * 10/2006 Stengele ................ G08C 19/02
340/870.02
8,852,775 B2 * 10/2014 McGuire ................ G01L 19/14
429/100
(Continued)

FOREIGN PATENT DOCUMENTS

| EP | 1057151 B1 | 4/2004 |
| EP | 2813908 A2 | 12/2014 |
| WO | WO 99/44180 | 9/1999 |

OTHER PUBLICATIONS

International Search Report and Written Opinion dated Jun. 1, 2015 for corresponding International Application No. PCT/RU2014/000223, filed Mar. 28, 2014.
(Continued)

Primary Examiner — An T Nguyen
(74) Attorney, Agent, or Firm — Westman, Champlin & Koehler, P.A.

(57) ABSTRACT

A process variable transmitter includes transmitter circuitry for determining a process variable from a sensor signal produced using a process sensor. The transmitter circuitry has at least one operating parameter. The process variable transmitter also includes a wireless communication module configured to be powered by a two-wire process control loop. The wireless communication module is capable of communicating wirelessly with a general-purpose mobile device using a general-purpose wireless communication standard such that the wireless communication module can instruct the transmitter circuitry to change a value of the at (Continued)

least one operating parameter based on a wireless message received from the general-purpose mobile device.

14 Claims, 7 Drawing Sheets

(56) References Cited

U.S. PATENT DOCUMENTS

| | | | | |
|---|---|---|---|---|
| 2008/0280568 | A1* | 11/2008 | Kielb | G01D 21/00 455/74.1 |
| 2010/0145476 | A1* | 6/2010 | Junk | G05B 19/042 700/7 |
| 2011/0010120 | A1* | 1/2011 | Wehrs | G01D 21/00 702/65 |
| 2011/0191500 | A1* | 8/2011 | Odayappan | G05B 19/0426 710/8 |
| 2012/0230309 | A1* | 9/2012 | Junk | G05B 19/4186 370/338 |
| 2013/0333440 | A1* | 12/2013 | Hedtke | G01L 27/007 73/1.57 |
| 2014/0167676 | A1* | 6/2014 | Mack | H02J 7/0004 320/101 |
| 2015/0268111 | A1* | 9/2015 | Hedtke | G01L 7/022 73/700 |
| 2015/0276432 | A1* | 10/2015 | Repyevsky | G05B 19/048 340/870.03 |
| 2015/0280754 | A1* | 10/2015 | Larson | G01D 11/245 375/295 |

OTHER PUBLICATIONS

Invitation to Pay Additional Fees and, Where Applicable, Protest Fee from PCT/RU2014/000223, dated Jan. 22, 2015.
Communication from European Patent Application No. 147933295, dated Nov. 11, 2016.
Examination Report from Australian Patent Application No. 2014388427, dated May 23, 2017.

* cited by examiner

SELECT ONE OR MORE

600
602 — SELECTED TRANSMITTERS
606 — NO. 1
NO. 2
NO. 3
CONFIGURATION PARAMETER
608 — PARAMETER 1: VALUE 1 — 612
610 — PARAMETER 2: VALUE 2 — 614
PARAMETER 3: VALUE 3 — 616

618 — BROADCAST CHANGES 604
116

FIG. 7

700
702 — SELECTED TRANSMITTERS
NO. 3
NO. 4
NO. 6
SOFTWARE UPDATES 710
1. UPDATE 1.5 712
2. UPDATE 2.0 706
708

704

714 — BROADCAST UPDATES

116

PROCESS VARIABLE TRANSMITTER WITH LOOP-POWERED WIRELESS TRANSCEIVER

CROSS-REFERENCE TO RELATED APPLICATION

This application is a Section 371 National Stage Application of International Application No. PCT/RU2014/000223, filed Mar. 28, 2014, not yet published, the contents of which are hereby incorporated by reference in their entirety.

BACKGROUND

The present disclosure relates to process variable transmitters. In particular, the present disclosure relates to process variable transmitters with wireless transceivers.

In processing plants, gases and liquids are routed through various conduits and tanks. In order to control the operation of a plant, the current status of the liquids and gases in the various portions of the plant as well as the state of controlled devices such as valves and burners must be monitored. The variables monitored to determine these states are referred to generally as process variables and can include flow rates, pressures, differential pressures, temperatures, tank levels, valve positions, and the like. These process variables are provided to a control room by field devices known as process variable transmitters. Each process variable transmitter includes a transmitter housing that encases at least one circuitry module used to determine a value for a process variable. The circuitry module determines the value for the process variable based on one or more sensor signals it receives from one or more process variable sensors that are measuring a state of the process fluid or a controlled device. The circuitry module also transmits the value of the process variable to a control room using either wireless communication or wired communication. In some cases, the circuitry module transmits the process variable using a two-wire process control loop which is also used to power the process variable transmitter.

One type of wireless communication system that has been used in the past is a specialized wireless communication standard designed to allow process transmitters to communicate with specialized gateways or specialized handheld devices that are not used outside of the process control industry. These systems minimize power consumption such that the wireless communication module can be powered from a battery or other local source or from the two-wire process control loop without impacting the performance of the process variable transmitters connected to the process control loop. Examples of such wireless communication modules include modules that use the WirelessHART® communication standard and that can be mounted within the transmitter housing or can be installed in a port on the housing. Another example system is shown in U.S. Patent Publication 2010/0145476.

SUMMARY

A process variable transmitter includes transmitter circuitry for determining a process variable from a sensor signal produced using a process sensor. The transmitter circuitry has at least one operating parameter. The process variable transmitter also includes a wireless communication module configured to be powered by a two-wire process control loop. The wireless communication module is capable of communicating wirelessly with a general-purpose mobile device using a general-purpose wireless communication standard such that the wireless communication module can instruct the transmitter circuitry to change a value of the at least one operating parameter based on a wireless message received from the general-purpose mobile device.

An industrial process field device includes circuitry powered by a two-wire process control loop that communicates along the two-wire process control loop using a communication protocol. The field device also includes wireless communication circuitry powered by the two-wire process control loop and wirelessly communicating in accordance with a general-purpose wireless communication standard while using the communication protocol.

A method includes providing a user interface on a general-purpose mobile device that identifies multiple process variable transmitters that have established a communication link with the mobile device. An input is received by the mobile device to broadcast instructions for storage on the multiple process variable transmitters. In response, the mobile device broadcasts the instructions to the multiple process variable transmitters simultaneously.

BRIEF DESCRIPTION OF THE DRAWINGS

FIG. 5 provides an example of a user interface on a general-purpose mobile device for selecting available process variable transmitters.

FIG. 6 provides an example of a user interface on a general-purpose mobile device for setting operating parameters.

FIG. 7 provides an example of a user interface on a general-purpose mobile device for transmitting software updates to process variable transmitters.

DETAILED DESCRIPTION OF ILLUSTRATIVE EMBODIMENTS

Figure 1:
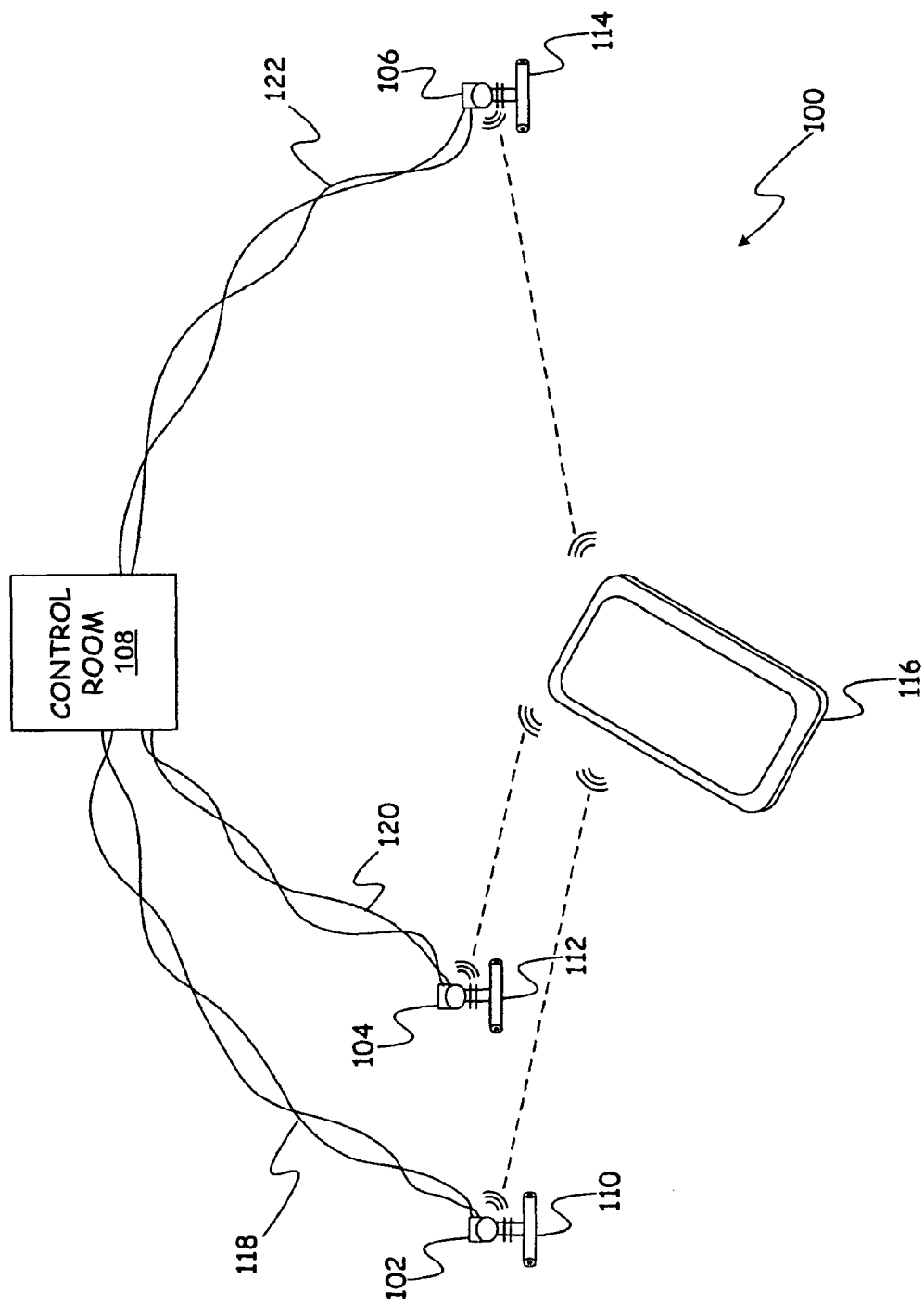
FIG. 1 is a plan view of a process control environment.

In the description below, a distinction is made between general-purpose devices and specialized devices. A general-purpose device is a device that has substantial uses outside of the process control industry and in fact was not designed with the process control industry in mind. Specialized devices are devices that have been specifically designed and manufactured for use in the process control industry. Similarly, a specialized communication standard is a standard that was developed specifically for the process control industry whereas a general-purpose communication standard is a standard that has substantial uses outside of the process control industry.

In general, a communication standard includes a collection of physical and procedural requirements that are implemented to allow two or more devices to communicate. The physical requirements can include signal frequencies, number of available channels, whether frequency hopping or channel hopping are to be used, effective range of communication, number of simultaneous connections that can be supported, and encoding schemes, for example. Procedural requirements include steps that are performed to detect devices that are available for connection, establishing a connection between two devices, conveying data between devices, identifying services provided by devices, requesting a service provided by a device, and terminating a connection between devices, for example. In addition, some communication standards include one or more protocol layers, where each layer describes the size and content of messages sent between devices. Protocols at one layer may be embedded within protocols of another layer.

When a process variable transmitter is placed in the field, it is common to configure and calibrate the transmitter as part of the commissioning process. The configuration and calibration of the transmitters can be done remotely from a control room by passing instructions along the two-wire process control loop or through a specialized wireless communication system. Alternatively, the transmitter can be configured and/or calibrated using a Local Operator Interface (LOI) provided on the transmitter itself. One example LOI is a module within the transmitter that includes an LCD screen and that receives inputs from two buttons that are normally covered by a metal label on the transmitter housing.

Process variable transmitters typically have a small amount of power available to them. In particular, for process variable transmitters that are powered by a two-wire process control loop, the amount of current that the process variable transmitter can draw is limited because the two-wire process control loop only provides 4-20 mA of current. Because the LOI is part of the transmitter, the power available for the LOI is also limited resulting in a limited amount of functionality for the LOI. Further, because the LOI and the transmitter essentially compete for available power, new LOI functionality requires a tradeoff against other transmitter improvements in the area of sensor measurement circuits, microcontrollers, software algorithms, communication circuits and others. Often times, new LOI functionality is a lower priority compared to other transmitter improvements and as such, new LOI functionality does not get added to the transmitter.

The embodiments described below provide improved usability and broader functionality for local operator interfaces by allowing the interfaces to run on general-purpose mobile devices such as Smartphones and PDAs, for example. The LOI application running on the mobile device is able to execute transmitter-specific commands to configure, monitor, or calibrate the transmitter or perform any other function allowed by the transmitter. Thus, the LOI application is executed within a general-purpose mobile device that has substantial uses outside of the process control industry. The general-purpose mobile device and the process variable transmitter communicate using a general-purpose wireless communication standard such as Bluetooth Low Energy (BLE), which is defined in Bluetooth wireless communication protocol version 4.1. However, the invention is not limited to BLE and may be implemented using any general, or specific purpose wireless communication standard.

The process variable transmitters of the embodiments below are connected to a two-wire process control loop, which powers the process variable transmitter and a general-purpose wireless communication circuit that implements a general-purpose communication standard such as the Bluetooth Low Energy communication standard. In accordance with some embodiments, the general-purpose wireless communication circuit and transmitter electronics for determining process variable values are combined on a same board within the process variable transmitter. In further embodiments, the general-purpose wireless communication circuit implements the general-purpose wireless communication standard on a physical level while utilizing a process control protocol, such as HART®, Foundation Fieldbus, Profibus, and wirelessHART® on an application level. This allows the general-purpose wireless circuit to emulate the industrial protocols and appear as a secondary master to the process variable transmitter.

In further embodiments, the general-purpose wireless communication circuit is a stand-alone module powered by the two-wire process control loop and connected in series between the two-wire process control loop and a process variable transmitter module. The general-purpose communication circuit manages active current draw by circuit techniques integrated with the transmitter electronics and in some embodiments provides power storage that is charged when the general-purpose communication circuit is inactive and is discharged when the general-purpose wireless communication circuit is active.

FIG. 1 provides a plan view of a process control environment 100 including process variable transmitters 102, 104, 106 and another location such as control room 108. Although a single control room 108 is shown, those skilled in the art will understand that control room 108 may be divided into separate control rooms. Process variable transmitters 102, 104 and 106 each determine one or more process variables related to a process fluid flowing through or stored in a respective conduit or tank 110, 112 and 114. Process variable transmitters 102, 104 and 106 are powered by and communicate through two-wire process control loops 118, 120 and 122, which are each connected to control room 108. In accordance with some embodiments, two-wire process control loops 118, 120 and 122 are 4-20 mA process control loops and the process variable transmitters communicate across the loops using one or more protocols such as HART®, Foundation Fieldbus, and Profibus, for example. Each process variable transmitter 102, 104 and 106 includes wireless communication circuitry and an antenna in order to communicate wirelessly with a general-purpose mobile device 116 using a general-purpose wireless communication standard such as Bluetooth Low Energy. Through user interfaces on general-purpose mobile device 116, it is possible to interact with one or more of the process variable transmitters simultaneously in order to set one or more operating parameters, such as configuration parameters and calibration parameters, of the process variable transmitters. Further, user interfaces on general-purpose mobile device 116 can be used to broadcast software updates to one or more process variable transmitters simultaneously in order to alter the instructions used by the process variable transmitters. In addition, general-purpose mobile device 116 may be used to monitor the values of process variables generated by one or more process variable transmitters.

Figure 2:
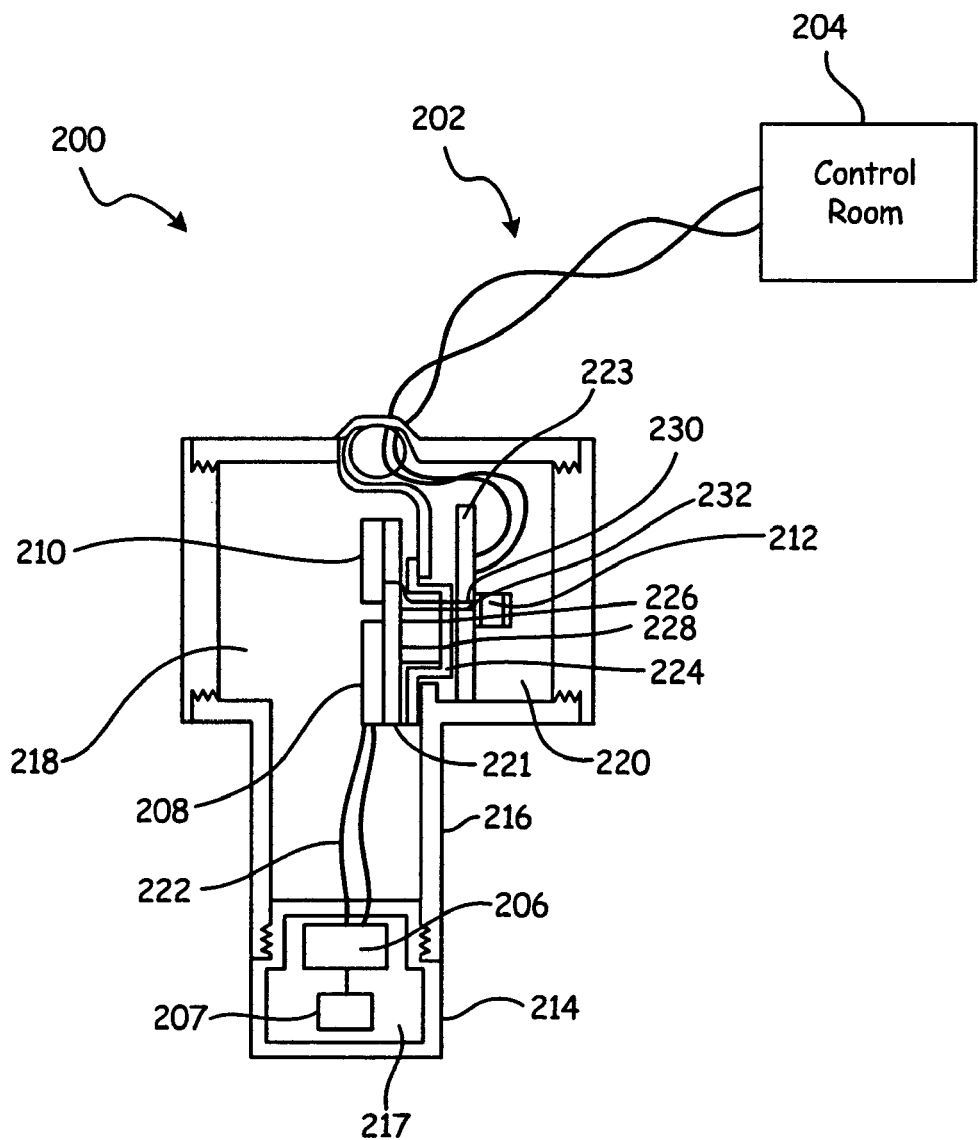
FIG. 2 is a cross-sectional view of a process variable transmitter.

FIG. 2 provides a cross-sectional view of an example process variable transmitter 200 that receives power from and communicates through a two-wire process control loop 202 connected to a control room 204. Process variable transmitter 200 includes sensor electronics or sensor circuitry 206, transmitter electronics or transmitter circuitry 208, general-purpose wireless communication circuitry 210 and a power storage component 212. Sensor circuitry 206 is connected to a process variable sensor 207 that may be positioned within a chamber 217 of a sensor housing 214 or within an element inserted into the conduit. Sensor circuitry 206 is located within sensor chamber 217, which is sealed from transmitter chamber 218 of transmitter housing 216 to reduce the likelihood that a process fluid will enter transmitter chamber 218. Transmitter circuitry 208 and general-purpose wireless communication circuitry 210 are positioned within transmitter chamber 218, and in accordance with one embodiment are mounted on a same printed circuit board 221. In this example, transmitter circuitry 208 is connected to sensor circuitry 206 by a flex cable 222, which carries power to sensor circuitry 206 and provides sensed values from sensor circuitry 206.

Transmitter housing 216 also includes terminal chamber 220 which includes a terminal block 223 having two terminal connections for connecting to the two-wire process control loop 202. In addition, optional power storage component 212 is mounted within terminal chamber 220. A sealing cap 224 seals terminal chamber 220 from transmitter chamber 218 to again reduce the likelihood of a process fluid entering terminal chamber 220. The signal on two-wire process control loop 202 is conveyed to transmitter circuitry 208 along pins 226 and 228, which extend through sealing cap 224. In this embodiment, pins 230 and 232, which also extend through sealing cap 224, connect power storage component 212 to general-purpose wireless communication circuitry 210. During inactive periods, when the general-purpose wireless communication circuitry 201 is inactive, a portion of the power from process control loop 202 that is passed along pins 226 and 228 is routed back through pins 230 and 232 to power storage component 212. In one configuration, when the general-purpose wireless communication circuitry 210 is active, power stored in power storage component 212 flows through pins 230 and 232 to general-purpose wireless communication circuitry 210.

Figure 3:
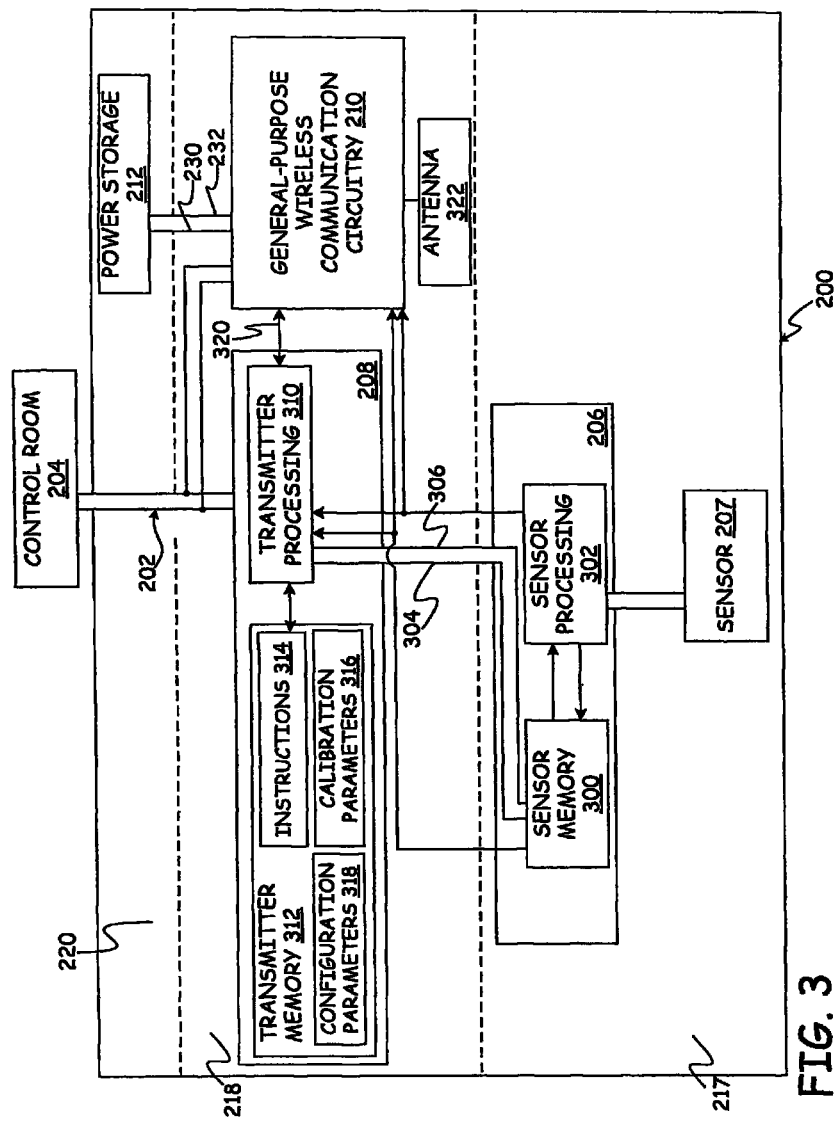
FIG. 3 is a block diagram of a process variable transmitter in accordance with a first embodiment.

Pursuant to one embodiment, FIG. 3 provides a block diagram of the elements of process transmitter variable 200. As shown in FIG. 3, sensor circuitry 206 includes a sensor memory 300 and sensor processing components 302. Sensor processing components 302 and sensor memory 300 receive power from transmitter circuitry 208 along power conductors 304 and 306, which form part of flex cable 222. Sensor processing components 302 includes one or more circuit components that together generate digital values representing a sensor output provided by sensor 207. For example, a change in the resistance or capacitance of sensor 207 is sensed by sensor processing components 302 and is converted into a digital value. The sensed values may be stored in a sensor memory 300 and/or may be provided to transmitter circuitry 208 and/or general-purpose wireless communication circuitry 210. Similarly, sensor values in sensor memory 300 may be provided to transmitter circuitry 208 and/or general-purpose wireless communication circuitry 210.

Transmitter circuitry 208 includes transmitter processing components 310 and transmitter memory 312. Transmitter memory 312 includes stored instructions 314 that are executed by transmitter processing components 310 to determine process variables from the sensed values provided by sensor processing components 302 and/or sensor memory 300. In addition, instructions 314 may include instructions for relaying and altering one or more operating parameters such as calibration parameters 316 and configuration parameters 318 that are also stored in transmitter memory 312. In order to determine the process variables, transmitter processing components 310 use one or more of the calibration parameters 316 and/or one or more of the configuration parameters 318. Examples of calibration parameters 316 include a zero value that indicates the value of the process variable sensor output that should be associated with the minimum process variable value and a span value that indicates the change in the process variable value for a change in the process variable sensor output. Transmitter processing components 310 provide the values of the process variables along two-wire process control loop 202 as either analog values or digital values. Transmitter processing components 310 can alternatively or in addition provide the process variable values to general-purpose wireless communication circuitry 210 along a data bus 320.

According to this embodiment, general-purpose wireless communication circuitry 210 implements a general-purpose wireless communication standard such as Bluetooth Low Energy. General-purpose wireless communication circuitry 210 is powered in part by two-wire process control loop 202. Since transmitter processing components 310 uses two-wire process control loop 202 to communicate with control unit 204, the amount of current that general-purpose wireless communication circuitry 210 can draw from two-wire process control loop 202 is limited. In many embodiments, the electrical components required to implement the general-purpose wireless communication circuitry draw more current when active than is available on two-wire process control loop 202. To compensate for this, general-purpose wireless communication circuitry 210 or scavenges power from two-wire process control loop 202 when general-purpose wireless communication circuitry 210 is "inactive" and stores the scavenged power in power storage component 212 using pins 230 and 232. When general-purpose wireless communication circuitry 210 is "active", power that has been stored in power storage component 212 is drawn by general-purpose wireless communication circuitry 210. General-purpose wireless communication circuitry 210 is considered to be "active" when waking-up, pre-processing, pre-receiving, receiving, transitioning, transmitting, post-processing and pre-sleeping and is considered to be "inactive" or sleeping at all other times.

In this embodiment, general-purpose wireless communication circuitry 210 transmits and receives messages using antenna 322, which may be printed on the same circuit board 221 as general-purpose wireless communication circuitry 210 and transmitter circuitry 208. Alternatively, antenna 322 may be placed in an antenna housing extending out of transmitter housing 216, where the antenna housing may be rotated relative to transmitter housing 216. General-purpose wireless communication circuitry 210 receives process variable values from transmitter circuitry 208 and sensor values from sensor memory 300 and/or sensor processing components 302. In addition, general-purpose wireless communication circuitry 210 can request that transmitter processing components 310 provide calibration parameters 316 and configuration parameters 318 stored in transmitter memory 312. Further general-purpose wireless communication circuitry 210 can instruct transmitter processing components 310 to overwrite instructions 314 stored in transmitter memory 312 with new instructions provided by general-purpose wireless communication circuitry 210. These new instructions can be received through antenna 322 using the general-purpose wireless communication standard.

General-purpose wireless communication circuitry 210 can operate in a request-response information exchange sequence in which requests and commands from a general-purpose mobile device are received according to the general-purpose wireless communication standard. General-purpose wireless communication circuitry 210 interprets the received requests/commands and provides an appropriate response to the general-purpose mobile device. When the request is a request for a current value of a calibration parameter 316 or a configuration parameter 318, general-purpose wireless communication circuitry 210 requests that transmitter circuitry 208 provide the specific calibration parameters or configuration parameters. When the request is for a value of a process control variable, general-purpose wireless communication circuitry 210 provides the process variable value generated by transmitter circuitry 208. When the request is a request for sensed values, general-purpose wireless communication circuitry 210 provides one or more of the sensed values generated by sensor circuitry 206. When the command is an instruction to overwrite the instructions in transmitter memory 312 in memory 312, general-purpose wireless communication circuitry 210 sends an instruction to transmitter processing component 310 to overwrite instructions 314 with the new instructions provided by general-purpose wireless communication circuitry 210. When the command is an instruction to alter a configuration parameter value or calibration parameter value, general purpose wireless communication circuitry 210 sends an instruction to transmitter processing component 310 to alter the corresponding value in transmitter memory 312.

General-purpose wireless communication circuitry 210 can also be configured to periodically transmit process variable values to the general-purpose wireless device. General-purpose wireless communication circuitry 210 can also be configured to transmit alarm signals to the general-purpose wireless device when the process variable values exceed certain alarm conditions.

General-purpose wireless communication circuitry 210 can actively advertise the existence of the process variable transmitter by periodically transmitting an identifier or an address that uniquely identifies the process variable transmitter within the process control environment. Alternatively, general-purpose wireless communication circuitry 210 can periodically scan for general-purpose mobile devices that are advertising an identifier in an attempt to establish a communication link. When a general-purpose mobile device wishes to establish a link with process variable transmitter 200, general-purpose wireless communication circuitry 210 executes instructions for establishing such a link. These instructions can include security instructions that verify that the general-purpose mobile device is allowed to link to the process variable transmitter. Such link layer security instructions can require simple identification of the mobile device and a comparison of that identification to a list of mobile devices that have been deemed trusted and that are therefore allowed to form a link with the process variable transmitter 200. Alternatively, general-purpose wireless communication circuitry 210 can require an encrypted key from the mobile device in order to authenticate the mobile device before allowing the mobile device to link to the general-purpose wireless communication circuitry 210.

The services provided by general-purpose wireless communication circuitry 210 may also be assigned to three different security levels including services that require authorization and authentication, services that require authentication only, and services that are open to all devices. For example, access to the current process variable values may be open to all devices, while access to configuration parameters and calibration parameters of the process variable transmitter 200 may require authentication of the device. Further, altering configuration parameters, calibration parameters or the instructions used by the transmitter circuitry may require that the device be authenticated and that the device be authorized to make such changes to this particular process variable transmitter.

In embodiments where the general-purpose wireless communication circuitry 210 uses the Bluetooth Low Energy communication standard, a General Attribute Profile (GATT) is used that provides message rules so that the messages sent by general-purpose wireless communication circuitry 210 emulate an existing communication industrial control protocol such as RS232, SPI, HART®, Foundation Fieldbus, Profibus, etc. Using the GATT profile, the industrial protocols are embedded within the Bluetooth Low Energy communication standard such that messages according to the industrial protocols can be transmitted to and received from process variable transmitter 200. This allows transmitter circuitry 208 to communicate through general-purpose wireless communication circuitry 210 to a general-purpose mobile device using the same protocol that transmitter circuitry 208 uses to communicate with control unit 204 over two-wire process control loop 202.

Figure 4:
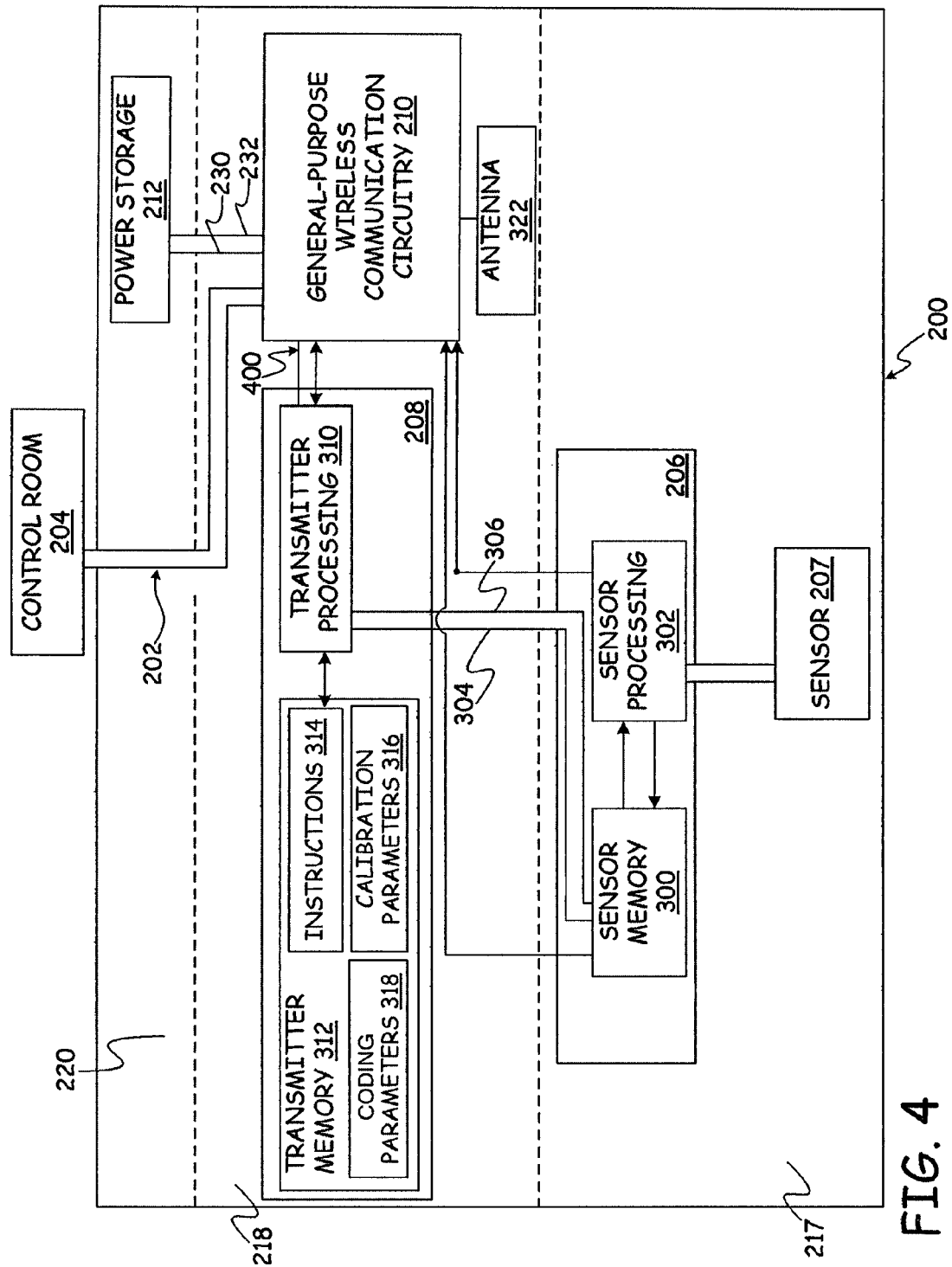
FIG. 4 is a block diagram of a process variable transmitter in accordance with a second embodiment.

As shown in FIG. 3, general-purpose wireless communication circuitry 210 is connected in parallel with transmitter circuitry 208 along two-wire process control loop 202. In FIG. 4, an alternative connection scheme is provided in which general-purpose wireless communication circuitry 210 is connected in series with transmitter circuitry 208 such that wireless communication circuitry 210 is positioned between two-wire process control loop 202 and transmitter circuitry 208 and a secondary two-wire process control loop 400 is provided between transmitter circuitry 208 and general-purpose wireless communication circuitry 210. In FIG. 4, general-purpose wireless communication circuitry 210 may be provided as a separate module that is inserted between two-wire process control loop 202 and transmitter circuitry 208.

In the configuration of FIG. 4, messages between control room 204 and transmitter circuitry 208 pass along both two-wire process control loop 202 and secondary two-wire process control loop 400. General-purpose wireless communication circuitry 210 transfers signals between two-wire process control loop 202 and two-wire process control loop 400. Ideally, general-purpose wireless communication circuitry 210 does not modify the values while transferring them between the two-wire process control loops.

In the configuration of FIG. 4, a general-purpose mobile device can also communicate with transmitter circuitry 208 through general-purpose wireless communication circuitry 210. In particular, the general-purpose mobile device communicates with the general-purpose wireless communication circuitry 210 using the general-purpose wireless communication standard while general-purpose wireless communication circuitry 210 communicates with transmitter circuitry 208 along two-wire process control loop 400 using an industrial process control protocol such as HART®, Foundation Fieldbus, or Profibus, for example. In the configuration of FIG. 4, transmitter circuitry 208 does not know whether a message originated from a general-purpose mobile device or from control unit 204. As such, control unit 204 acts as a primary master to transmitter circuitry 208 and general-purpose wireless communication circuitry 210 acts as a secondary master to transmitter circuitry 208. The remaining components of FIG. 4 are identical to the components of FIG. 3 and are not discussed separately in connection with FIG. 4.

General-purpose mobile device 116 includes a memory that contains one or more mobile applications that can be selected for execution by a user. In accordance with some embodiments, one or more of the mobile applications stored on general-purpose mobile device 116 allow a user to interact with one or more process variable transmitters. Such mobile applications may be downloaded using a wireless or wired connection between general-purpose mobile device 116 and one or more servers. The mobile applications may be updated automatically or on demand from the user such that when new process variable transmitters are created, new functionality is added to process variable transmitters or new communication standards are adopted for process variable transmitters, the mobile applications will continue to be able to communicate with the process variable transmitters and to take advantage of any new functionality provided by the process variable transmitters. In accordance with some embodiments, the mobile applications provide at least the same functionality provided by a local operator interface (LOI) on the process variable transmitter. In further embodiments, the mobile application allows users to execute commands to configure, monitor, calibrate or any other function allowed by the transmitter. In some embodiments, a single mobile application provides a common user interface for multiple different types of transmitters.

General-purpose mobile device 116 includes an operating system, such as Android or iOS for example, that provides visualization tools that can be utilized by the mobile applications.

FIG. 5 provides an example of a user interface 500 provided by a mobile application on general-purpose mobile device 116. In user interface 500, a collection of selectable icons 502, 504, 506, 508, 510 and 512 are provided. Each icon represents a separate process variable transmitter that has established a communication link with general-purpose mobile device 116 using the general-purpose wireless communication standard. In user interface 500, one or more of the selectable icons may be selected at the same time.

FIG. 6 provides an example of a user interface 600 provided by a mobile application on general-purpose mobile device 116 that can be used to set values for configuration or calibration parameters for transmitters selected in the user interface of FIG. 5.

In FIG. 6, a field 602 indicates which process variable transmitters have been selected and a field 604 provides a list of parameters and their associated values such as parameters 606, 608 and 610 and their respective values 612, 614 and 616. Values 612, 614 and 616 initially reflect the value of those parameters in the selected transmitters if the value is the same in all the transmitters. If the value is not the same in all the transmitters, the value is left blank. Values 612, 614 and 616 are editable and the user may enter new values by selecting the respective value field and either typing in the new value or speaking the new value. When the user is satisfied with the values set for each of the parameters, the new configuration or calibration values may be broadcast to the selected transmitters using Broadcast Changes button 618. Note that if more than one transmitter is selected in field 602, general-purpose mobile device 116 will broadcast the configuration or calibration parameters to all of the selected process variable transmitters simultaneously. The broadcasted values are sent along with a command indicating that the values for the configuration and calibration parameters should be stored in the transmitter memory in place of the existing configuration/calibration parameters. Upon receiving this command, general-purpose wireless communication circuitry 210 instructs transmitter processing components 310 to store the new calibration/configuration parameters in transmitter memory 312.

FIG. 7 provides an example of a user interface 700 provided by a mobile application on general-purpose mobile device 116 that can be used to broadcast software updates to one or more process variable transmitters. In FIG. 7, a selected transmitter field 702 includes a list of process variable transmitters that were selected in user interface 500 of FIG. 5. A software updates field 704 includes a list of available software updates for the selected process variable transmitter. For example, in FIG. 7, two updates 706 and 708 are available. Checkboxes 710 and 712 allow a user to select which of the software updates are to be broadcast to the selected process variable transmitters. When the user selects Broadcast Updates button 714, general-purpose mobile device 116 transmits the software updates with the earliest update being transmitted first and the latest update being transmitted last. The software updates are transmitted along with a command instructing general-purpose wireless communication circuitry 210 to pass the updates to transmitter circuitry 208 and to instruct transmitter processing components 310 to store the updates over the existing instructions 314 in transmitter memory 312. When Broadcast Updates button 714 is selected, general-purpose mobile device 116 broadcasts the software updates to each of the selected transmitters in field 702 simultaneously thereby allowing multiple process variable transmitters to be updated with a single broadcast from general-purpose mobile device 116.

Figure 8:
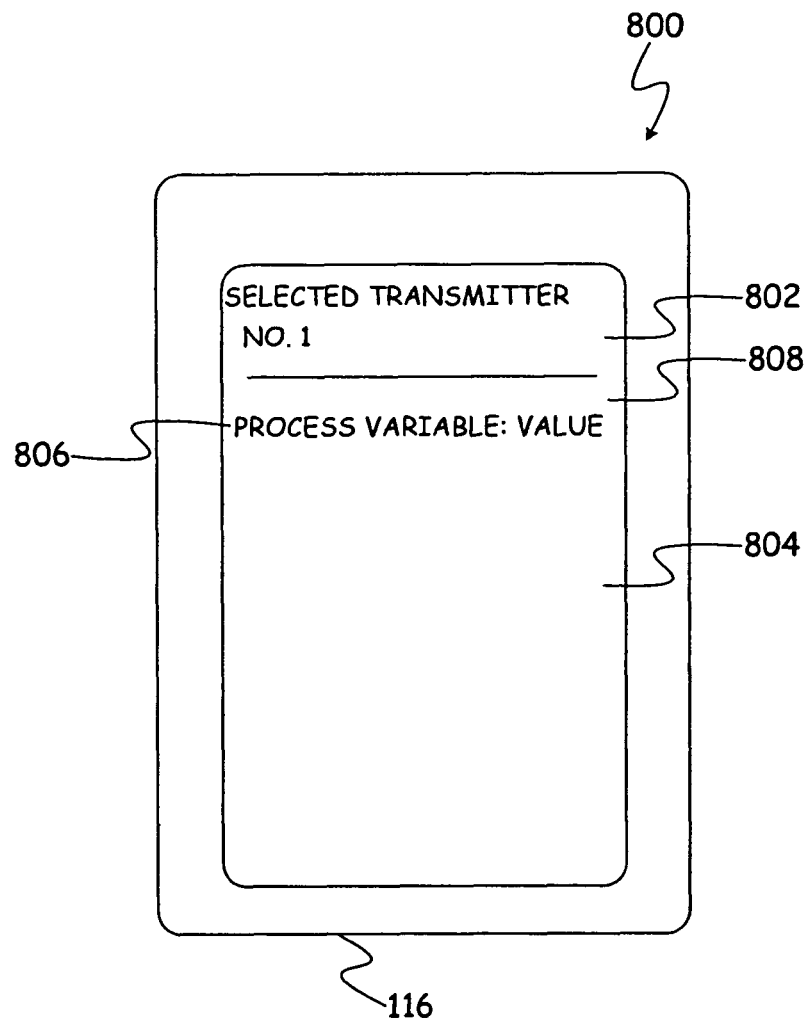
FIG. 8 provides an example of a user interface on a general-purpose mobile device for reading a process variable value.

FIG. 8 provides an example of a user interface 800 provided by a mobile application on general-purpose computing device 116 that displays the value of one or more process variables as determined by a selected transmitter. In FIG. 8, a selected transmitter field 802 indicates an identifier for a process variable transmitter selected in the user interface of FIG. 5. The process variable field 804 includes one or more process variables such as process variable 806 and its associated value 808 as last determined by the selected process variable transmitter. User interface 800 may be dynamic such that value 808 changes based on new values transmitted by general-purpose wireless communication circuitry 210. Thus, through user interface 800, general-purpose mobile device 116 can be used to monitor a process variable transmitter.

Figure 9:
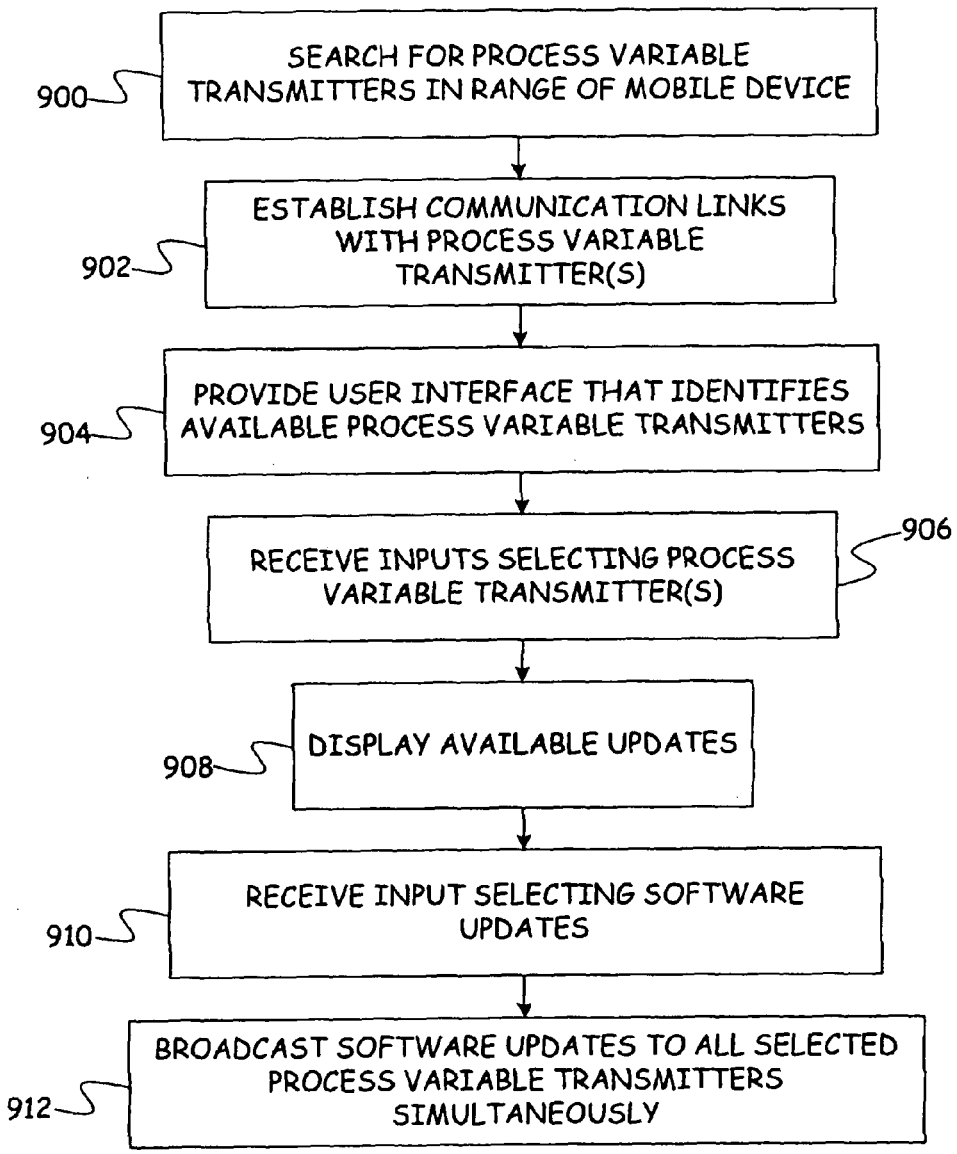
FIG. 9 provides a flow diagram of a method.

FIG. 9 provides a method of broadcasting software updates to multiple process variable transmitters simultaneously. At step 900, the general-purpose mobile device searches for process variable transmitters that are within the range of the mobile device. This search can involve listening for process variable transmitters that are advertising their unique identifier or by transmitting a request for the process variable transmitters to identify themselves and listening for responses to that request.

At step 902, the general-purpose mobile device establishes a communication link with each process variable transmitter that it has detected using the general-purpose wireless communication standard. At step 904, mobile device 116 provides a user interface that identifies all of the available process variable transmitters such as user interface 500 of FIG. 5.

At step 906, mobile device 116 receives an input selecting one or more process variable transmitters and at step 908, mobile device 116 displays a user interface that provides a selectable list of available software updates such as user interface 700 of FIG. 7. At step 910, mobile device 116 receives an input selecting one or more of the software updates and at step 912, mobile device 116 broadcasts the selected software updates to all of the selected process variable transmitters simultaneously. Thus, all of the selected process variable transmitters receive the same signals containing the software updates at the same time.

Although the embodiments above have been described in connection with a handheld mobile device other devices are contemplated that can be used to communicate with a process variable transmitter using a general-purpose wireless communication standard. These other devices include devices that are worn by the user such as glasses with built-in displays and watches. In addition, fixed computing devices may be used instead of mobile devices to communicate with the process variable transmitter using the general-purpose wireless communication standard.

In further embodiments, each process variable transmitter may have its installation location coordinates stored in transmitter memory 312 and the location and status of the process variable transmitter may be transmitted to the general-purpose mobile device and may be shown to a user through one or more user interfaces.

In the embodiment above, a star network has been described with a general-purpose mobile device as the central node in the network. In further embodiments, a mesh network is formed by forming multiple star networks using multiple general-purpose mobile or fixed devices that communicate with each other and the process variable transmitters using the general-purpose wireless communication standard.

In the embodiments above, process variable transmitters have been discussed. However, the embodiments may be implemented in other industrial process field devices such as valve controls such that a general-purpose mobile device may be used to control the state of the field device by communicating with general-purpose wireless communication circuitry in the field device using a general-purpose wireless communication standard.

Although the present invention has been described with reference to preferred embodiments, workers skilled in the art will recognize that changes may be made in form and detail without departing from the spirit and scope of the invention.

What is claimed is:

1. A process variable transmitter comprising:
   transmitter circuitry for determining a process variable from a sensor signal produced using a process sensor, the transmitter circuitry having at least one operating parameter;
   a wireless communication module configured to be powered by a two-wire process control loop and capable of communicating wirelessly with a general-purpose mobile device using a general-purpose wireless communication standard such that the wireless communication module can instruct the transmitter circuitry to change a value of the at least one operating parameter based on a wireless message received from the general-purpose mobile device;
   the process variable transmitter further comprises a power storage component providing additional power to the wireless communication module; and
   wherein the power storage component stores power from the two-wire process control loop when the wireless communication module is inactive and provides additional power to the wireless communication module when the wireless communication circuitry is active.

2. The process variable transmitter of claim 1 further comprising a housing wherein the transmitter circuitry and the wireless communication module are within the housing.

3. The process variable transmitter of claim 1 wherein the wireless communication module is connected in series between the two-wire process control loop and the transmitter circuitry.

4. The process variable transmitter of claim 1 wherein the general-purpose wireless communication standard permits multiple process variable transmitters to communicate with the general-purpose mobile device at a same time.

5. The process variable transmitter of claim 4 further comprising a memory storing operating instructions for determining process variable values from sensor values and instructions for overwriting the operating instructions with new operating instructions received using the general-purpose wireless communication standard.

6. The process variable transmitter of claim 5 wherein the process variable transmitter receives the new operating instructions when the new operating instructions are broadcast by the general-purpose mobile device to multiple process variable transmitters at the same time.

7. The process variable transmitter of claim 1 wherein the general-purpose wireless communication standard provides a protocol layer that allows emulation of a communication protocol used on the two-wire process control loop.

8. The process variable transmitter of claim 1 wherein the at least one operating parameter comprises a zero value.

9. The process variable transmitter of claim 1 wherein the at least one operating parameter comprises a span value.

10. An industrial process field device comprising:
    circuitry powered by a two-wire process control loop that communicates along the two-wire process control loop using a communication protocol;
    wireless communication circuitry powered by the two-wire process control loop and wirelessly communicating in accordance with a general-purpose wireless communication standard while using the communication protocol;
    wherein the industrial process field device comprises a process variable transmitter and the circuitry determines a process variable value based on signals generated from a sensor;
    the industrial process field device further comprises a power storage component located in the process variable transmitter and providing additional power to the wireless communication circuitry; and
    wherein the power storage component stores power from the two-wire process control loop when the wireless communication circuitry is inactive and provides additional power to the wireless communication circuitry when the wireless communication circuitry is active.

11. The industrial process field device of claim 10 wherein the communication protocol is specific to process control systems.

12. The industrial process field device of claim 11 wherein general-purpose wireless communication standard comprises a standard that is used by general-purpose wireless devices that have substantial uses outside of process control systems.

13. The industrial process field device of claim 10 wherein the circuitry comprises a memory containing calibration parameters for calibrating the process variable transmitter and wherein the wireless communication circuitry can set the calibration parameters based on wireless signals received using the general-purpose wireless communication standard.

14. The industrial process field device of claim 10 wherein the circuitry comprises a memory containing instructions for determining process variable values and wherein the wireless communication circuitry can alter the instructions in the memory based on messages simultaneously broadcast to multiple process variable transmitters using the general-purpose wireless communication standard.

\* \* \* \* \*